(12) United States Patent
Lequesne et al.

(10) Patent No.: US 9,425,702 B2
(45) Date of Patent: Aug. 23, 2016

(54) SYSTEM AND METHOD FOR SAFE SWITCHING IN AN AC-TO-AC CONVERTER

(71) Applicant: Eaton Corporation, Cleveland, OH (US)

(72) Inventors: Bruno Patrice-Bernard Lequesne, Menomonee Falls, WI (US); Yakov Lvovich Familiant, Brown Deer, WI (US); Qiang Fu, Milwaukee, WI (US); Vijay Bhavaraju, Germantown, WI (US)

(73) Assignee: Eaton Corporation, Cleveland, OH (US)

( * ) Notice: Subject to any disclaimer, the term of this patent is extended or adjusted under 35 U.S.C. 154(b) by 131 days.

(21) Appl. No.: 14/290,333

(22) Filed: May 29, 2014

(65) Prior Publication Data

US 2015/0349653 A1   Dec. 3, 2015

(51) Int. Cl.
*H02M 5/293* (2006.01)
*H02M 1/00* (2006.01)

(52) U.S. Cl.
CPC ...... *H02M 5/293* (2013.01); *H02M 2001/0058* (2013.01); *H02M 2005/2932* (2013.01)

(58) Field of Classification Search
CPC ....... H02M 1/36; H02M 1/083; H02M 5/275; H02M 5/293; H02M 5/297; H02M 3/156–3/157; G05F 1/32; G05F 1/45; H02P 1/00; H02P 1/05; H02P 1/26; H02P 2205/01
USPC .................. 323/235–239, 241, 252, 282–285
See application file for complete search history.

(56) References Cited

U.S. PATENT DOCUMENTS 5,949,672 A   9/1999   Bernet
6,459,606 B1  10/2002  Jadric
(Continued)

FOREIGN PATENT DOCUMENTS

JP    10-164845 A      6/1998
JP    2010-028942 A    2/2010
KR    10-2009-0044126 A  5/2009

OTHER PUBLICATIONS

Saracoglu et al., "A Novel Technique for Optimal Efficiency Control of Induction Motor Fed by PWM IGBT AC Chopper," 2004 35th Annual IEEE Power Electronics Specialists Conference, Aachen, Germany, 2004, pp. 3353-3358.
(Continued)

*Primary Examiner* — Yemane Mehari
(74) *Attorney, Agent, or Firm* — Ziolkowski Patent Solutions Group, SC

(57) ABSTRACT

A system and method for controlling switching in an AC-AC converter is disclosed. A controller for the AC-AC converter determines a direction of current flow on supply lines that provide AC power to the AC-AC converter and determines a switching pattern for each of a plurality of line-side switches and each of a plurality of floating-neutral side switches in the AC-AC converter based on the determined direction of current flow on each of the supply lines. The controller causes the line-side switches and the floating-neutral side switches to operate in an ON or OFF condition according to the determined switching pattern, such that a controlled current flow is output from the AC-AC converter. The controller also implements a safe-switching routine when transitioning from a first switching pattern to a second switching pattern that prevents a non-zero current from being interrupted during the transitioning between the first and second switching patterns.

20 Claims, 3 Drawing Sheets

(56) References Cited

U.S. PATENT DOCUMENTS

| | | | |
|---|---|---|---|
| 8,947,030 B2* | 2/2015 | Familiant | H02P 27/16 318/400.01 |
| 9,030,852 B2* | 5/2015 | Wijekoon | H02M 5/297 363/131 |
| 2012/0068655 A1 | 3/2012 | Inuduka et al. | |
| 2014/0184190 A1* | 7/2014 | Jankovic | H02P 1/28 323/311 |
| 2014/0233278 A1* | 8/2014 | Li | H02M 7/53873 363/37 |

OTHER PUBLICATIONS

Guangqiang et al., "A Novel Induction Motor Soft Starter With Torque Pulsations Elimination Capability," 2005 IEEE IECON Conference, pp. 1695-1700.

* cited by examiner

| CASE | SUB-CASE | Ia | Ib | Ic | IGBT 22 | IGBT 24 | IGBT 26 | IGBT 28 | IGBT 30 | IGBT 32 |
|---|---|---|---|---|---|---|---|---|---|---|
| U | U1 | POSITIVE + | NEGATIVE − | NEGATIVE − | ON | OFF | OFF | OFF | OFF | OFF |
|  | U2 | POSITIVE + | NEGATIVE − | NEGATIVE − | OFF | OFF | OFF | OFF | ON | ON |
| UV | UV | POSITIVE + | NEARLY 0 | NEGATIVE − | ON | ON | ON | OFF | OFF | OFF |
| V | V1 | POSITIVE + | POSITIVE + | NEGATIVE − | ON | ON | OFF | OFF | OFF | OFF |
|  | V2 | POSITIVE + | POSITIVE + | NEGATIVE − | OFF | OFF | OFF | OFF | OFF | ON |
| VW | VW | NEARLY 0 | POSITIVE + | NEGATIVE − | ON | ON | ON | OFF | OFF | OFF |
| W | W1 | NEGATIVE − | POSITIVE + | NEGATIVE − | OFF | ON | OFF | OFF | OFF | OFF |
|  | W2 | NEGATIVE − | POSITIVE + | NEGATIVE − | OFF | OFF | ON | OFF | OFF | ON |
| WU' | WU' | NEGATIVE − | POSITIVE + | NEARLY 0 | ON | ON | ON | OFF | OFF | OFF |
| U' | U'1 | NEGATIVE − | POSITIVE + | POSITIVE + | OFF | ON | ON | OFF | OFF | OFF |
|  | U'2 | NEGATIVE − | POSITIVE + | POSITIVE + | OFF | OFF | OFF | ON | OFF | OFF |
| U'V' | U'V' | NEGATIVE − | NEARLY 0 | POSITIVE + | ON | OFF | ON | OFF | OFF | OFF |
| V' | V'1 | NEGATIVE − | NEGATIVE − | POSITIVE + | OFF | OFF | ON | ON | OFF | OFF |
|  | V'2 | NEGATIVE − | NEGATIVE − | POSITIVE + | OFF | ON | OFF | OFF | ON | OFF |
| V'W' | V'W' | NEARLY 0 | NEGATIVE − | POSITIVE + | ON | OFF | ON | OFF | OFF | OFF |
| W' | W'1 | POSITIVE + | NEGATIVE − | POSITIVE + | ON | OFF | OFF | OFF | ON | OFF |
|  | W'2 | POSITIVE + | NEGATIVE − | POSITIVE + | OFF | OFF | OFF | OFF | OFF | OFF |
| W'U | W'U | POSITIVE + | NEGATIVE − | NEARLY 0 | ON | ON | ON | OFF | OFF | OFF |

FIG. 2

SYSTEM AND METHOD FOR SAFE SWITCHING IN AN AC-TO-AC CONVERTER

BACKGROUND OF THE INVENTION

The present invention relates generally to AC-to-AC electronic converters and, more particularly, to an AC-to-AC converter and method of operation thereof that provides for safe switching in the AC-to-AC converter that avoids voltage spikes during switching transitions.

AC-AC converters function to convert an AC voltage to another AC voltage. One type of AC-AC converters commonly used in industry are soft starters, which are industrial control devices that make it possible to start AC induction motors smoothly, with a reduced inrush current. Soft starters typically employ silicon controlled rectifiers (SCRs) for reducing voltage applied to the motor and thus reducing the starting inrush current to the motor. While SCRs can be turned on at will, they cannot be turned off in a dynamic and controllable fashion, as SCRs turn off naturally when the current reaches zero. SCRs thus lack the desired capability to provide precise control over current—with more control over the current being desirable in order to reduce harmonics, reduce heat dissipation, and further improve AC motor starting, restarting, and stopping characteristics.

Other devices are available that make dynamic and controllable current interruption possible, such as insulated gate bipolar transistors (IGBTs) for example. IGBTs have been used to start motors in various ways, such as by first rectifying an incoming AC voltage, smoothing the DC voltage with a capacitor, and then inverting it with six IGBTs (three-phase full-bridge DC-to-AC inverter). However, such use of IGBTs is often restricted to complex "motor drives," and while the use of IGBTs in motor drives works very well, the motor drives that incorporate the IGBTs are typically significantly more expensive than a soft starter. While certain elements in the motor drive can be avoided/eliminated in an attempt to reduce cost, such as avoiding usage of a DC link by using a matrix configuration, such converters use many more devices and are also costly.

Another type of circuit that has been used for providing controllable current interruption is called an "AC chopper." In an AC chopper, IGBTs are switched on and off at a given, typically high, frequency (kHz or more). The switching is, to a large extent, divorced from the incoming voltage, in terms of timing and phasing. This necessitates the use of capacitors in the AC chopper, in order to provide a path for the energy in the machine inductance when the IGBTs are turned off, as the energy left in the inductance at turn off time can create large voltage spikes, proportional to L*di/dt. These capacitors need to be large, typically commensurate with the machine inductance. As such, in the end, AC choppers require large passive elements such as capacitors, thus incurring a high cost.

More recently, IGBT-based AC-AC converters have been developed that do not need large switching capacitors in order to operate—with a switching algorithm being employed to control operation of the IGBTs in order to make such a configuration feasible. The switching algorithm controls switching of a plurality of IGBTs to limit the transient voltages and currents to the AC load during start-up by controlling a magnitude of the duty cycle of the device, and further controls switching of a plurality of IGBTs such that the current to the AC load is never interrupted. In controlling the switching of the IGBTs, the switching algorithm follows a switching logic that is based on the direction (or sign) of the current in all phases.

It is recognized, however, that—as the switching logic is predicated on having perfect knowledge of the direction/sign of the current in all phases—issues can arise when any of the phase currents traverse zero (i.e., zero crossing) and a transitioning from one switching pattern to another switching pattern is implemented. That is, in some cases, because of noise for instance, the system may believe that some current is negative while in fact it is positive, or vice-versa, and an erroneous current reading may lead to switching the IGBTs in a wrong manner. In some cases, no harm may result from an incorrect switching pattern, but in other cases an incorrect switching pattern may result in current in one phase being interrupted, thereby creating a voltage spike because of the largely inductive nature of the machine windings.

It would therefore be desirable to provide a system and method of controlling switching in an IGBT-based AC-AC converter that allows for voltage spikes to be avoided during switching pattern transitions in the event of an erroneous current sign reading or identification.

BRIEF DESCRIPTION OF THE INVENTION

The present invention provides a system and method for controlling switching in an IGBT-based AC-AC converter to avoid voltage spikes during switching pattern transitions in the event of an erroneous current sign reading or identification.

In accordance with one aspect of the invention, a controller for an AC-AC converter to control current flows from an AC source to an AC load is programmed to determine a direction of current flow on each of one or more supply lines that provide AC power to the AC-AC converter, each supply line corresponding to a phase in the AC load. The controller is also programmed to determine a switching pattern for each of a plurality of line-side switches and each of a plurality of floating-neutral side switches in the AC-AC converter based on the determined direction of current flow on each of the supply lines and cause each of the plurality of line-side switches and each of the plurality of floating-neutral side switches to operate in either an ON condition or an OFF condition according to the determined switching pattern, such that a controlled current flow is output from the AC-AC converter. The controller is further programmed to implement a safe-switching routine when transitioning from a first switching pattern to a second switching pattern, the safe-switching routine preventing a non-zero current from being interrupted during the transitioning from the first switching pattern to the second switching pattern.

In accordance with another aspect of the invention, a load control device to control current flow to an AC load includes a circuit having an input connectable to a line terminal of an AC source, an output connectable to a load terminal of an AC load, one or more supply lines each corresponding to a phase in the AC load and connecting the input and output to transmit power from the AC source to the AC load, a plurality of line-side switches connected between the line terminals and the load terminals such that each supply line includes at least one line-side switch connected thereto, and a plurality of floating-neutral side switches connected to the load terminal at one end and together at a common connection at another end, such that each supply line includes at least one floating-neutral side switch connected thereto. The load control device also includes a controller connected to the circuit and programmed to implement a switching pattern for each of the plurality of line-side switches and each of the plurality of floating-neutral side switches based on a determined direction of current flow on each of the supply lines and transition between switching patterns responsive to a changing direction of current flow on a supply line. In transitioning between switching patterns, the controller is further programmed to establish a transition window and implement a transition switching pattern for each of the plurality of line-side switches and each of the plurality of floating-neutral side switches for a duration of the transition window, to prevent a voltage spike from occurring.

In accordance with yet another aspect of the invention, a method for controlling current flow to an AC load includes providing a circuit in series between an AC power source and the AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end. The method also includes selectively operating the circuit in an active mode and a free-wheeling mode so as to selectively provide a full phase voltage to the load terminals during the active mode and a zero voltage to the load terminals during the free-wheeling mode of operation, wherein operating the circuit further includes implementing a first switching pattern for each of the line-side switches and each of the floating-neutral side switches based on a positive or negative current sign on each of the one or more supply lines and implementing a second switching pattern for each of the line-side switches and each of the floating-neutral side switches upon current on one supply lines changing its current sign upon traversing a zero crossing, wherein, in transitioning from the first switching pattern to the second switching pattern, a transition switching pattern is implemented during a transition window established about the zero crossing of the current changing its sign.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a table illustrating a switching logic for switching IGBTs in the AC load control device in FIG. 1, according to an embodiment of the invention.

DETAILED DESCRIPTION OF THE PREFERRED EMBODIMENTS

The embodiments of the invention set forth herein relate to a system and method for controlling switching in an IGBT-based AC-AC converter to avoid voltage spikes during switching pattern transitions in the event of an erroneous current sign reading or identification. An AC load control device is provided that includes a plurality of switches therein having a simple topology/arrangement, with the switches limiting the transient voltages and current to the AC load during operation. A controller in the AC load control device implements a control scheme for controlling the switches such that the current in the AC load is never discontinuous— with the control scheme also preventing voltage spikes during switching pattern transitions in the event of an erroneous current sign reading or identification.

Figure 1:
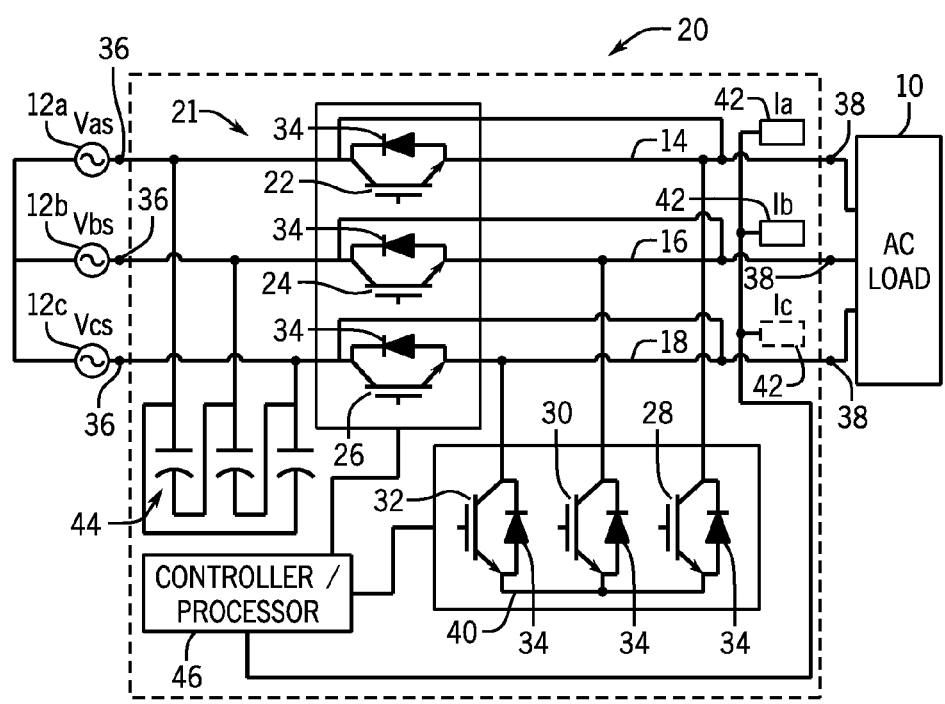
FIG. 1 is a schematic view of an AC load (e.g., a motor) control device for controlling 3-phase AC currents to an AC load in a controlled fashion, according to an embodiment of the invention.

Referring to FIG. 1, a three-phase, AC load 10 is shown for use with embodiments of the invention. According to one embodiment, the AC load 10 includes one or more induction motors where power is supplied from the stator to the rotor (not shown) thereof by means of electromagnetic induction, with the AC load 10 being operatively connected to a three-phase AC source 12a-12c through corresponding supply lines 14, 16 and 18, respectively, so as to receive power therefrom. Thus, for purposes of reference, supply line 14 corresponds to a Phase A, supply line 16 corresponds to a Phase B, and supply line 18 corresponds to a Phase C. As shown in FIG. 1, a motor control device 20 is connected between AC source 12a-12c and AC load 10 that performs an AC-AC conversion of the AC waveform generated by AC source 12a-12c to another AC waveform for input to the AC load 10. In an exemplary embodiment of the invention, motor control device 20 comprises a soft-starter configured to limit the inrush current to AC load 10 during start-up, resulting in a "soft" motor start that avoids inrush currents, and thus the motor control device is hereafter referred to as a soft-starter. It is recognized, however, that embodiments of the invention are not limited to soft-starter applications and may be incorporated into other motor control devices such as AC motor drives, AC generator drives, and other related devices, including variable frequency drives (VFDs) as a particular example. Generally speaking, control device 20 uses a 3-phase AC supply voltage as input and provides a controlled AC voltage or current to the load—and thus the control device is hereafter referred to as an AC-AC converter.

The basic structure of AC-AC converter 20 is shown in FIG. 1 (i.e., circuitry 21 of the AC-AC converter) as including a plurality of switches 22, 24, 26, 28, 30, 32 connected to supply lines 14, 16, 18, with each of the switches having a unidirectional control and being coupled in anti-parallel with a diode 34 for flow of current in the reverse direction, so as to control the current flow and, in turn, the terminal voltages of the AC load 10. As shown in FIG. 1, switches 22, 24, 26 are drawn such that they control the current as it flows from supply to load (defined as positive current), with the diodes 34 in anti-parallel with switches 22, 24, 26, merely allowing the current to flow back to the load in an uncontrolled manner (defined as negative current). In an alternate configuration (not shown), switches 22, 24, 26 control, in a similar but opposite fashion, the current flowing from load to supply and diodes 34 in anti-parallel with switches 22, 24, 26 merely allowing the current to the load in an uncontrolled manner. Therefore, in the broadest sense, a positive current is defined here as flowing in that one direction between supply and load which is controlled by switches 22, 24, 26, and a negative current is defined as flowing in the reverse direction, that is, the direction between supply and load which is not controlled by switches 22, 24, 26. In other words, positive current is synonymous with current in the controlled direction, and negative current is synonymous with current in the direction which is not controlled. According to an exemplary embodiment of the invention, the switches are in the form of IGBTs, and thus the switches are hereafter referred to generally as IGBTs. However, it is noted that "IGBT" should be understood as any switch that can be turned ON and OFF at will (at any frequency including high frequencies in the tens of kHz and beyond), IGBTs being currently a common technology in many induction motor drive applications. Other kinds of electronic switches, such as MOSFETs or MCTs (MOS-Controlled Thyristors) for instance, can be used depending on voltage level, power level, and other considerations.

According to an exemplary embodiment of the invention, an arrangement of six IGBTs 22, 24, 26, 28, 30, 32 is provided in the AC-AC converter. Three IGBTs 22, 24, 26 are connected between the line terminals 36 of AC source 12a-12c and the load terminals 38 of AC load 10, and thus are herein referred to as "line-side IGBTs". Three other IGBTs 28, 30, 32 that are referred to herein as "floating-neutral side IGBTs" are connected to the load terminals 38 at one end and together at a common connection 40 at the other end. This common connection 40 forms what is referred to herein as a "floating neutral point," with the qualifier "floating" being used to distinguish this point from the load neutral or source neutral, to which it is not connected. As shown in FIG. 1, six IGBTs are provided corresponding to the number of phases (i.e., three phases), with one "line-side IGBT" and one "floating-neutral side IGBT" per phase. It is recognized, however, that any number of phases can be envisioned and thus embodiments of the invention can be readily extended from a 3-phase example, with two IGBTs per phase in general, with special consideration for the case of a single-phase system which requires two "line-side IGBTs" (one each for the line and return) and similarly two "floating-neutral side IGBTs," as will be discussed in greater detail later on.

According to one embodiment of the invention, a means to sense the current in at least two of the load terminals 38 is included in AC-AC converter 20, such as sensors 42 positioned on two or more of supply lines 14, 16, 18. Sensors 42 could also be configured to sense voltage on supply lines 14, 16, 18. Additionally, according to one embodiment of the invention, capacitors 44 are positioned between the line terminals 36 and the line-side IGBTs 22, 24, 26 to provide buffering. While such capacitors 44 may be included in AC-AC converter 20, it is recognized that the capacitors are small in size/capacity, as the controlling of the IGBTs 22, 24, 26, 28, 30, 32 according to a desired control scheme (as will be explained in detail below) provides for a controlled uninterrupted load current to AC load 10 so as to obviate the need for larger capacitors and/or capacitors all together.

Also included in AC-AC converter 20 is a controller or processor 46 configured to switching of IGBTs 22, 24, 26, 28, 30, 32 via gate drive signals thereto. During operation (e.g., starting, stopping, etc.) of AC load 10, controller 46 functions to selectively cause each of IGBTs to operate in an ON or OFF condition, so as to control the current flow (and therefore the voltage) applied to the AC load 10. According to embodiments of the invention, controller 46 is configured and programmed to implement a switching pattern control scheme that provides for full control of the currents provided to load terminals 38 on supply lines 14, 16, 18, while providing for the current in the load inductances to never be interrupted.

In implementing a switching control scheme or pattern for the IGBTs 22, 24, 26, 28, 30, 32, the controller 46 first implements an initial routine at start-up of AC load 10. According to one embodiment of this initial routine, at onset, all of the line-side IGBTs 22, 24, 26, are pulsed together. The current then flows according to relative phase voltage magnitudes at that instant in time, with a direction of the current flow being measured/detected by the current sensors 42. According to another embodiment of the invention, rather than measuring the actual current flow by way of current sensors 42, the line voltages are instead measured, with a determination being made from such measurement of which of IGBTs 22, 24, 26, 28, 30, 32 should be turned ON.

Subsequent to performing of the initial routine, the controller 46 controls a switching of the IGBTs 22, 24, 26, 28, 30, 32 to the ON and OFF conditions based on a sensed direction of current flow (positive or negative) on each of the supply lines 14, 16, 18. More specifically, in whichever one phase (or two phases) the current is positive, either the corresponding line side IGBT(s) 22, 24, 26, are turned ON and all other IGBTs are turned OFF or, alternatively, the floating-neutral side IGBTs 28, 30, 32 in the other two (or one) phases are turned ON and all other IGBTs are turned OFF. In controlling the IGBTs to operate in the ON and OFF states in such a manner via controller 46, current is caused to always flow through the AC load 10.

The switching logic described above is summarized in FIG. 2, in that the switching of IGBTs 22, 24, 26, 28, 30, 32 is primarily governed by the sign of the current of each phase at any given time. Referring to FIG. 2, and with continued referenced to FIG. 1, "positive" current should be understood as "greater than zero", or "greater than a small positive number," and similarly for "negative" current. This is for cleaner implementation in the presence of noise, and to avoid control confusion when the current signal is exactly zero. The width of zero crossing zone is determined by the robustness of sensing/detection circuit and the requirement of AC load. As a result of controller 46 implementing the switching logic illustrated in FIG. 2, the load terminals 38 will see either full phase voltage as provided by the source ($V_{a1}=V_{as}$, $V_{b1}=V_{bs}$, and $V_{c1}=V_{cs}$) or zero voltage in all three phases ($V_a=V_b=V_c=0$). The first instance is referred to as an "active period" while the latter is referred to as a "free-wheeling period." The "active" mode/period refers to energy transfer from the source to the load (as in a motoring mode for a machine), or from the load to the source (as in a generating, regenerating, or braking mode for a motor or a generator), as opposed to the "free-wheeling" mode/period where any energy transfer is generally confined to the load (losses in the drive and wiring notwithstanding).

In order to provide a better understanding of the switching logic applied by controller 46 for controlling operation of IGBTs 22, 24, 26, 28, 30, 32, several examples are set forth here below.

Example 1

In a first example, as a result of the initial routine, it is determined that Current $I_a$ is positive while both $I_b$ and $I_c$ are negative (State U). Then, IGBT 22 (i.e., the line-side IGBT in Phase A) is left ON and all other IGBTs 24, 26, 28, 30, 32 are turned OFF or left OFF. Full line voltage is then applied to the load terminals 38 during an active period. This is Sub-State U1 in FIG. 2. At any time (i.e., "control time") during this State U, the voltage at the load terminals 38 can be switched from line voltage to zero by turning OFF IGBT 22 and turning ON IGBTs 30, 32 (Sub-State U2), so as to transition to a free-wheeling period. IGBTs 30, 32 are the two floating-neutral side IGBTs that are not in Phase A. The "control time", therefore, divides State U into two periods, first an active period, second a free-wheeling period. The ratio of the active period over the sum of the active period and the free-wheeling period is referred to as the duty cycle, and is a key element in controlling the average voltage supplied to the AC load 10.

Thus, during the active period, current flows through the AC load 10 from the source 12a-12c (Phase A voltage $V_{as}$), and then back to the source 12a-12c via the diodes 34 in anti-parallel with IGBTs 24, 26. During the free-wheeling period, the current continues, uninterrupted, through the diodes 34 in anti-parallel with IGBT 28 and then through IGBTs 30, 32.

It can be appreciated that as long as the current $I_a$ is positive and the currents $I_b$ and $I_c$ negative (i.e., State U), one can switch back and forth from Sub-State U1 to Sub-State U2, back to Sub-State U1, then Sub-State U2, etc. How often this switching of the IGBTs 22, 24, 26, 28, 30, 32 occurs is recognized as the system switching frequency and how long the switches are in each cycle is expressed as a duty cycle. This switching frequency is preferably a multiple of the number of phases (usually 3) and the supply frequency (usually 60 Hz or 50 Hz), as other frequencies generate a DC component of current and are generally undesirable. For example, the switching frequency may be a multiple of 180 Hz (or a multiple of three times 60 Hz, assuming 60 Hz is the line frequency). In general, the higher the frequency, the smaller the harmonic content, and the higher the switching losses. It is recognized that other switching frequencies are possible; however, as the resulting currents would have a DC component, such frequencies would be used only if such a DC component were desirable. Further, it may be noted that such a switching frequency need not be constant. It may be desirable to have a higher switching frequency under some circumstances and a lower switching frequency under other circumstances, so as for instance to balance harmonic content and switching losses. The switching frequency may even be varied within the duration of a given state, such as State U.

Example 2

In a second example, two of the currents are positive, such as $I_a$ and $I_b$, while the third one ($I_c$) is negative. This is State V in FIG. 2. In such a case, the line-side IGBTs 22, 24 in those two phases will be in the ON condition during an "active period" while all other IGBTs 26, 28, 30, 32 are OFF (see Sub-State V1). A "free-wheeling period" can be similarly obtained by turning OFF these two switches IGBTs 22, 24, and turning ON IGBT 32 in the third phase (Sub-State V2).

The same logic applies in the states labeled W, or U', V', and W' in FIG. 2. In particular, States U', V', and W' are mirror images of States U, V, W, with whichever current is positive in State U, V, or W, being negative in States U', V', and W', and vice-versa.

Figure 3:
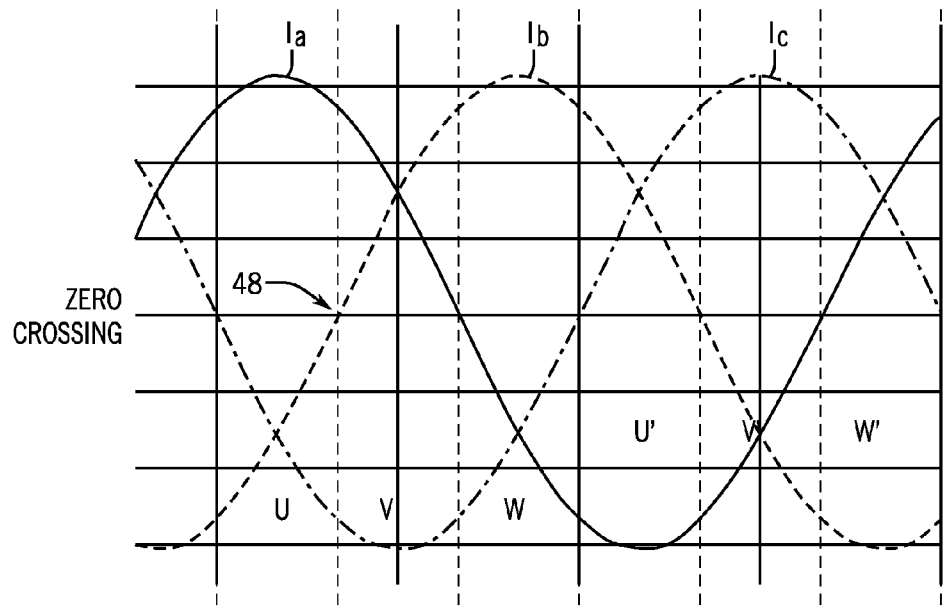
FIG. 3 is graph illustrating a three phase current over time in relation to the switching logic of FIG. 2, including the zero crossing which the three-phase current traverses.

With respect to the switching logic described in FIG. 2, it is recognized that the switching logic is predicated on the accurate sensing of the direction/sign of the current in all phases. However, due to current signal noise or other possible factors, determining the direction/sign of the current as the three phase currents traverse the zero crossing may be difficult. FIG. 3 illustrates the three phase current $I_a$, $I_b$, $I_c$ in relation to the particular switching patterns U, V, or W, U', V', W' over time, with it being seen therein that each of the sinusoidal phase currents crosses the zero crossing—indicated at 48—at varying times. Because of noise, the system may believe that some current is negative while in fact it is positive, or vice-versa, and an erroneous current reading may lead to switching the IGBTs 22, 24, 26, 28, 30, 32 in a wrong manner when transitioning between different states or switching patterns.

Referring again to FIG. 2, the transitions between different states or switching patterns are indicated therein by the designations UV, VW, WU', U'V', V'W' and W'U. As can be seen in FIG. 2, during each of these transitions between states, the current of one phase $I_a$, $I_b$ or $I_c$ nears the zero crossing, while the current on the remaining two phases is not near the zero crossing. Accordingly, it is desirable that the current on the phase that is about to traverse the zero crossing be analyzed closely—with a switching transition being implemented that ensures that current is not interrupted and that voltage spikes are avoided.

Figure 4:
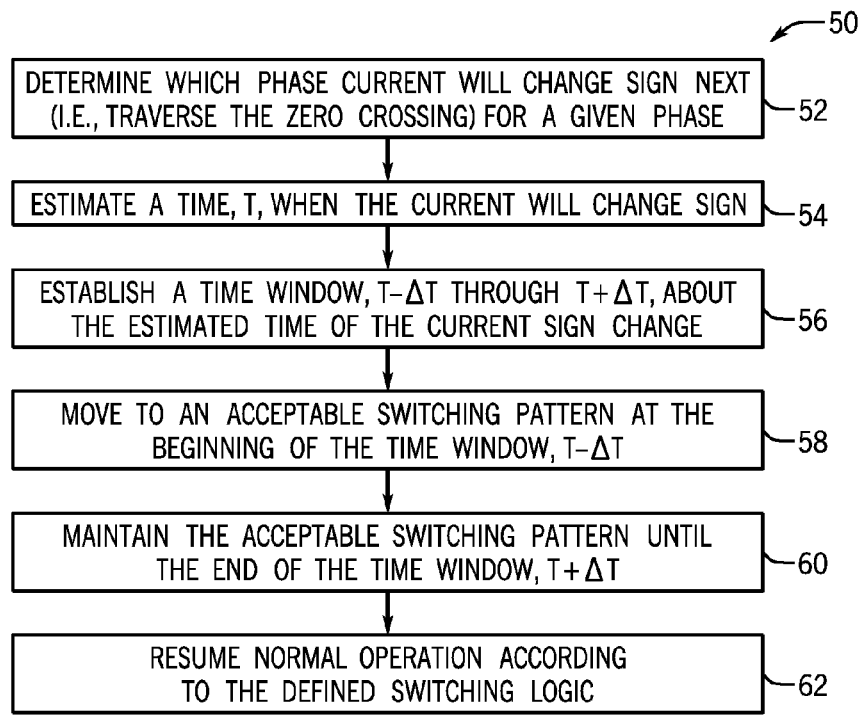
FIG. 4 is a flowchart illustrating a technique for controlling switching in an IGBT-based AC-AC converter that implements the switching logic of FIG. 2, according to an embodiment of the invention.

In general, the process for transitioning from one state to another state in a controlled and desirable fashion can be summarized by the technique 50 illustrated in FIG. 4. As shown therein, the technique 50 performs the following steps when transitioning between states: STEP 52—while in a given state, determine which phase current is going to change sign next (i.e., traverse the zero crossing; STEP 54—determine the likely time, T, when that current will change sign; STEP 56—establish a time window around that likely time, [T−ΔT; T+ΔT]; STEP 58—at the beginning of that time window (time T−ΔT), move to one of three states/switching patterns that is correct, or benign if incorrect (correct/incorrect in comparison to an expected/believed current sign); STEP 60—maintain that state/switching pattern unchanged until the end of the window, time T+ΔT; and STEP 62—at the end of the window, time T+ΔT, resume normal operation. The technique 50 can guarantee (barring a fault) that the system is in one state/switching pattern at the onset of the window and in a subsequent state/switching pattern at the end of the window, so as to provide a safe transition between states. The window must thus be designed to be as wide as necessary to ensure this is the case, yet narrow enough to generate minimum distortion of the current waveform.

For the purpose of best illustrating the implementation of technique 50 into the switching logic of FIG. 2, two examples are provided of transitions between states/switching patterns. In general, it should be noted that all the switching pattern transitions in the system logic of FIG. 2 can be grouped into two types: transitioning from one positive current to two positive currents (States UV, WU', and V'W'), and transitioning from two positive currents to one positive current (States VW, U'V', and W'U). The switching from one positive current to two positive currents is illustrated in the first example—a transition from State U to State V (referred to as "Case 1")— and a transition from two positive currents to one positive current is illustrated in the second example—a transition from State V to State W (referred to as "Case 2"). In either case (and in general) a transition between states occurs when just one phase current changes sign (for instance, $I_b$, from negative to positive when transitioning from State U to State V). Analyzing the transitions from State U to State V and from State V to State W is therefore sufficient to provide a general solution to the problem.

Referring again to FIG. 4, in determining which phase current is going to change sign next while in a given state at STEP 52, the three-phase current waveform $I_a$, $I_b$, $I_c$ (such as shown in FIG. 3) can be analyzed and it can be easily identified which phase current is going to traverse the zero crossing point and will thus change sign next. For Case 1, when starting in State U, it is seen that phase current $I_b$ will change sign next. For Case 2, when starting in State V, it is seen that phase current $I_a$ will change sign next.

Next, in determining the likely time, T, when that current will change sign at STEP 54, it is recognized that there are various ways to determine when the current will traverse zero. The transition from State U to State V of Case 1, when $I_b$ goes from negative to positive, is used here as an example. In determining the time, T, when $I_b$ will change sign, an exemplary method tracks all three phase currents over their trajectories, then extrapolates to zero. For $I_b$, which is the current that will next change its sign when in State U, the current can be tracked during States V' and W', and further extrapolating $I_b$ during State U leads to determining time T. In another embodiment, it is recognized that current-sign changes (under steady-state conditions) occur every 60 electrical degrees. Therefore, knowing the base frequency (50 Hz or 60 Hz, typically) leads to extrapolating T from the previous current sign changes, taking into consideration at least the two following modifying factors: 1) This span may be slightly different from 60° in case of phase imbalance. Barring a fault situation, these should be minor and, for a given machine, repeatable (therefore a correcting factor could be learned). 2) More importantly, however, the 60° span can vary more significantly during transients, because the system power factor can vary rapidly (this happens in particular when a motor reaches synchronous speed). Such power factor changes can be anticipated from the observation of the previous actual current zero crossings.

Next, in establishing a time window around the likely time, T, when the current will change sign at STEP 56, one or more of several methods may be used to establish the window width. In one embodiment, the window width (T−ΔT through T+ΔT) is determined by presetting the window width number. In another embodiment, if the current signal noise is measured during operation, the window width is set based on the noise measurement (in Amperes) plus some safety factor, divided by the current slope near zero (in Amperes/second), this slope being established from previous zero crossings. In yet another embodiment, the window width is established concurrently with the determination of the time, T, when the current e.g., $I_b$, will change sign, by using a current threshold ΔI (for instance, x % of peak current), such that the window opens when current −ΔI (for a negative to positive transition) is detected, and closes when +ΔI is sensed by the current sensors. (or +ΔI then −ΔI for a positive to negative transition). The current threshold ΔI is then determined by presetting a number and/or, if the current signal noise is measured during operation, from the noise measurement (in Amperes), plus some safety factor. It is recognized that any of these above described methods can be complemented with adaptive techniques, to adjust and refine the number according to the particulars of the application, and that the methods may also be combined.

Next, with regard to STEP 58, in moving to one of three states/switching patterns at the beginning of the established time window (time T−ΔT) that is correct or benign if incorrect (i.e., correct/incorrect in comparison to an expected/believed current sign on the zero crossing phase current), Cases 1 and 2 are referred to in order to illustrate movement to a next state. In Case 1, the system is in State U at the beginning of the time window, with the IGBTs 22, 24, 26, 28, 30, 32 being in the switching pattern of Sub-State U1 or U2. In Case 2, the system is in State V at the beginning of the time window, with the IGBTs 22, 24, 26, 28, 30, 32 being in switching pattern of Sub-State V1 or V2.

At the end of the window, the system is in State V (Case 1) or State W (case 2), and the IGBTs will be in the switching pattern of Sub-State V1 or V2 (Case 1) or in the switching pattern of Sub-State W1 or W2 (Case 2). Accordingly, in each of Cases 1 and 2, there logically are four possible Sub-States to choose from to hold during the duration of the window: U1, U2, V1, and V2 (Case 1), and V1, V2, W1, and W2 (Case 2). In transitioning between states during the established time window, it is recognized that one of the four sub-states needs to be avoided in each case, while the other three sub-states are acceptable. More specifically, the sub-state should be avoided that would interrupt a non-zero current at the opening of the window. Thus, in Cases 1 and 2 the sub-states to avoids are Sub-State V2 (Case 1) and Sub-State W1 (Case 2), as each of these would interrupt a non-zero current at the opening of the window. In operation Sub-State V2 leaves IGBT 30 OFF, when current $I_b$ is negative, while Sub-State W1 leaves IGBT 22 OFF, when $I_a$ is positive. Conversely, the other three sub-states (in each of Cases 1 and 2) are considered to be acceptable, as they either leave ON one of the line-side or floating-neutral side IGBTs in the phase whose current is changing signs or allow the current to go to zero in the phase whose current is changing signs, and block it at that zero level. More specifically, Sub-States U2 and V1 in Case 1 and Sub-States V1 and W2 in Case 2 leave ON one of the line-side or floating-neutral side IGBTs in the phase whose current is changing signs, while Sub-State U1 in Case 1 and Sub-State V2 in Case 2 allow the current to go to zero in the phase whose current is changing signs, and blocks it at that zero level.

With respect specifically now to Case 1, the controlled switching that is performed from State U to State V to ensure a "safe" transition between states is discussed in greater detail, with each of the three acceptable switching patterns or "routines" being examined.

In a first routine of transitioning from State U to State V, the IGBTs are controlled to transition to an active, energy-providing switching pattern, with the IGBTs being maintained/moved to the Sub-State U1 switching pattern and remaining in Sub-State U1 until the end of the window. That is, if the IGBTs are in Sub-State U1 at the beginning of the window, at time T−ΔT, they remain in Sub-State U1 until the end of the window, at time T+ΔT. Conversely, if the IGBTs are operated according to the Sub-State U2 switching pattern at the beginning of the window, time T−ΔT, then the IGBTs will transition to Sub-State U1 (immediately after the beginning of the window) and remain there until the end of the window.

At time T−ΔT (or very shortly thereafter), the IGBTs are thus operated according to Sub-State U1, with a negative $I_b$, such that device 20 (FIG. 1) is operated in a safe mode with current $I_b$ going through diode 34 (associated with IGBT 24). At some point, at or around time T, the current $I_b$ actually reaches zero. In this situation, since the IGBTs are being operated according to Sub-State U1 and remaining there, current $I_b$ is blocked by the diode 34 and by IGBT 24, which is OFF. Consequently, $I_b$ stays zero. At the end of the window, the system switches to Sub-State V1, such that IGBT 24 is turned ON, and $I_b$ can start flowing positively into the load, in a safe manner. The device 20 is thus then in State V and can operate safely therein.

In a second routine of transitioning from State U to State V, the IGBTs are controlled to transition to a free-wheeling period switching pattern, with the IGBTs being maintained/moved to the Sub-State U2 and remaining in Sub-State U2 until the end of the window. That is, if the IGBTs are in Sub-State U2 at the beginning of the window, at time T−ΔT, they remain in Sub-State U2 until the end of the window, at time T+ΔT. Conversely, if the IGBTs are operated according to the Sub-State U1 switching pattern at the beginning of the window, time T−ΔT, then the IGBTs will transition to Sub-State U2 (immediately after the beginning of the window) and remain there until the end of the window.

At time T−ΔT (or very shortly thereafter), the IGBTs are thus operated according to Sub-State U2, with a negative $I_b$, such that device 20 (FIG. 1) is operated in a safe mode with current $I_b$ going through IGBT 30. At some point, at or around time T, the current $I_b$ actually reaches zero and current $I_b$ can start flowing (positive) through the diode 34 (associated with IGBT 30), thus providing for a natural and uninterrupted flow of current $I_b$. At the end of the window, the system switches to Sub-State V2, such that IGBT 30 is turned OFF, which is considered a safe state since $I_b$ is positive. The device 20 is thus then in State V and can operate safely therein.

In a third routine of transitioning from State U to State V, the IGBTs are controlled to transition to an active, energy-providing switching pattern, with the IGBTs being moved to the Sub-State V1 and remaining in Sub-State V1 until the end of the window. That is, if the IGBTs are in Sub-State U1 at the beginning of the window, at time T−ΔT, the IGBTs will transition to Sub-State V1. Similarly, if the IGBTs are in Sub-State U2 at the beginning of the window, at time T−ΔT, the IGBTs will again transition to Sub-State V1.

Sub-State V1 is similar to Sub-State U1, with the addition of having IGBT 24 turned ON. At first, as $I_b$ is negative, having IGBT 24 ON has no effect, as current $I_b$ is flowing through diode 34 associated with IGBT 24. However, when the current $I_b$ traverses zero, $I_b$ then starts flowing through the IGBT 24 in a seamless manner. At the end of the window, with the IGBTs already being in State V, normal operation can be resumed.

With respect specifically now to Case 2, the controlled switching that is performed from State V to State W to ensure a "safe" transition between states is discussed in greater detail, with each of the three acceptable routines/switching patterns being examined. In transitioning from State V to State W in Case 2, a similar logic is used as that when transitioning from State U to State V in Case 1—i.e., a similar logic is used when transitioning from two positive currents to one positive current, with current $I_a$ going from positive to negative.

In a first routine of transitioning from State V to State W, the IGBTs are controlled to transition to an active, energy-providing switching pattern, with the IGBTs being maintained/moved to the Sub-State V1 switching pattern and remaining in Sub-State V1 until the end of the window. That is, if the IGBTs are in Sub-State V1 at the beginning of the window, at time T−ΔT, they remain in Sub-State V1 until the end of the window, at time T+ΔT. Conversely, if the IGBTs are operated according to the Sub-State V2 switching pattern at the beginning of the window, time T−ΔT, then the IGBTs will transition to Sub-State V1 (immediately after the beginning of the window) and remain there until the end of the window.

At time T−ΔT (or very shortly thereafter), the IGBTs are thus operated according to Sub-State V1, with a positive $I_a$, such that device 20 (FIG. 1) is operated in a safe mode with current $I_a$ going through IGBT 22. At some point, at or around time T, the current $I_a$ actually reaches zero. In this situation, current $I_a$ can flow through the diode 34 associated with IGBT 22 and, consequently, $I_a$ reverses sign smoothly. At the end of the window, the system switches to Sub-State W1, such that IGBT 22 is turned OFF, which is considered a "safe" condition since $I_a$ is negative. The device 20 is thus then in State W and can operate safely therein.

In a second routine of transitioning from State V to State W, the IGBTs are controlled to transition to a free-wheeling period switching pattern, with the IGBTs being maintained/moved to the Sub-State V2 and remaining in Sub-State V2 until the end of the window. That is, if the IGBTs are in Sub-State V2 at the beginning of the window, at time T−ΔT, they remain in Sub-State V2 until the end of the window, at time T+ΔT. Conversely, if the IGBTs are operated according to the Sub-State V1 switching pattern at the beginning of the window, time T−ΔT, then the IGBTs will transition to Sub-State V2 (immediately after the beginning of the window) and remain there until the end of the window.

At time T−ΔT (or very shortly thereafter), the IGBTs are thus operated according to Sub-State V2, with a positive $I_a$, such that device 20 (FIG. 1) is operated in a safe mode with current $I_a$ going through the diode 34 associated with IGBT 28. At some point, at or around time T, the current $I_a$ actually reaches zero and current $I_a$ is blocked by the diode 34 associated with IGBT 28. At the end of the window, the system switches to Sub-State W2, such that IGBT 28 is turned ON, such that $I_a$ can start flowing negatively. The device 20 is thus then in State W and can operate safely therein.

In a third routine of transitioning from State V to State W, the IGBTs are controlled to transition to a free-wheeling switching pattern, with the IGBTs being moved to the Sub-State W2 and remaining in Sub-State W2 until the end of the window. That is, if the IGBTs are in Sub-State V1 at the beginning of the window, at time T−ΔT, the IGBTs will transition to Sub-State W2. Similarly, if the IGBTs are in Sub-State V2 at the beginning of the window, at time T−ΔT, the IGBTs will again transition to Sub-State W2.

At time T−ΔT (or very shortly thereafter), the IGBTs are thus operated according to Sub-State W2, with a positive $I_a$, such that device 20 (FIG. 1) is operated in a safe mode with current $I_a$ going through the diode 34 associated with IGBT 28. At some point, at or around time T, the current $I_a$ actually reaches zero and, since IGBT 28 is already ON, the current $I_a$ can reverse sign and flow through IGBT 28 in a seamless manner. At the end of the window, with the IGBTs already being in State W, normal operation can be resumed.

In each of Cases 1 and 2, the transition between states can be achieved—in a simplest manner—by one of two methods. In a first method, all line-side IGBTs 22, 24, 26 are turned ON at the beginning of the window (and all floating-neutral side IGBTs 28, 30, 32 are turned OFF). Thus, in Case 1—during the transition from State U to State V—in essence, the third routine (Sub-State V1) is selected and, in Case 2—during the transition from State V to State W—in essence, the first routine (Sub-State V1) is selected. In a second method, all floating-neutral side IGBTs 28, 30, 32 are turned ON at the beginning of the window (and all line-side IGBTs 22, 24, 26 are turned OFF). Thus, in Case 1—during the transition from State U to State V—in essence, the second routine (Sub-State U2) is selected and, in Case 2—during the transition from State V to State W—in essence, the third routine (Sub-State W2) is selected.

In all above instances, one of the IGBTs—in phase C—is turned ON in a way that is "useless", but this leads to the simpler algorithm of "all line-side IGBTs ON". The first method—with all line-side IGBTs 22, 24, 26 being turned ON—favors the energy-providing phase of the system, while the second method—with all floating-neutral side IGBTs 28, 30, 32 being turned ON—gives more time to the free-wheeling phase. Therefore, the first method is preferable during acceleration periods while the second method is better during deceleration. During steady-state, one can alternate between the two to neutralize any effect on speed.

A technical contribution for the disclosed method and apparatus is that it provides for a computer implemented technique for controlling switching in an IGBT-based AC-AC converter. The technique implements a control scheme for controlling switching of a plurality of IGBTs in a motor control device such that the current in a connected AC load is never discontinuous—with the control scheme also preventing voltage spikes during switching pattern transitions in the event of an erroneous current sign reading or identification.

Therefore, according to one embodiment of the present invention, a controller for an AC-AC converter to control current flows from an AC source to an AC load is programmed to determine a direction of current flow on each of one or more supply lines that provide AC power to the AC-AC converter, each supply line corresponding to a phase in the AC load. The controller is also programmed to determine a switching pattern for each of a plurality of line-side switches and each of a plurality of floating-neutral side switches in the AC-AC converter based on the determined direction of current flow on each of the supply lines and cause each of the plurality of line-side switches and each of the plurality of floating-neutral side switches to operate in either an ON condition or an OFF condition according to the determined switching pattern, such that a controlled current flow is output from the AC-AC converter. The controller is further programmed to implement a safe-switching routine when transitioning from a first switching pattern to a second switching pattern, the safe-switching routine preventing a non-zero current from being interrupted during the transitioning from the first switching pattern to the second switching pattern.

According to another embodiment of present invention, a load control device to control current flow to an AC load includes a circuit having an input connectable to a line terminal of an AC source, an output connectable to a load terminal of an AC load, one or more supply lines each corresponding to a phase in the AC load and connecting the input and output to transmit power from the AC source to the AC load, a plurality of line-side switches connected between the line terminals and the load terminals such that each supply line includes at least one line-side switch connected thereto, and a plurality of floating-neutral side switches connected to the load terminal at one end and together at a common connection at another end, such that each supply line includes at least one floating-neutral side switch connected thereto. The load control device also includes a controller connected to the circuit and programmed to implement a switching pattern for each of the plurality of line-side switches and each of the plurality of floating-neutral side switches based on a determined direction of current flow on each of the supply lines and transition between switching patterns responsive to a changing direction of current flow on a supply line. In transitioning between switching patterns, the controller is further programmed to establish a transition window and implement a transition switching pattern for each of the plurality of line-side switches and each of the plurality of floating-neutral side switches for a duration of the transition window, to prevent a voltage spike from occurring.

According to yet another embodiment of the present invention, a method for controlling current flow to an AC load includes providing a circuit in series between an AC power source and the AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end. The method also includes selectively operating the circuit in an active mode and a free-wheeling mode so as to selectively provide a full phase voltage to the load terminals during the active mode and a zero voltage to the load terminals during the free-wheeling mode of operation, wherein operating the circuit further includes implementing a first switching pattern for each of the line-side switches and each of the floating-neutral side switches based on a positive or negative current sign on each of the one or more supply lines and implementing a second switching pattern for each of the line-side switches and each of the floating-neutral side switches upon current on one supply lines changing its current sign upon traversing a zero crossing, wherein, in transitioning from the first switching pattern to the second switching pattern, a transition switching pattern is implemented during a transition window established about the zero crossing of the current changing its sign.

The present invention has been described in terms of the preferred embodiment, and it is recognized that equivalents, alternatives, and modifications, aside from those expressly stated, are possible and within the scope of the appending claims.

What is claimed is:

1. A controller for an AC-AC converter to control current flows from an AC source to an AC load, the controller being programmed to:
   determine a direction of current flow on each of one or more supply lines that provide AC power to the AC-AC converter, each supply line corresponding to a phase in the AC load;
   determine a switching pattern for each of a plurality of line-side switches and each of a plurality of floating-neutral side switches in the AC-AC converter based on the determined direction of current flow on each of the supply lines;
   cause each of the plurality of line-side switches and each of the plurality of floating-neutral side switches to operate in either an ON condition or an OFF condition according to the determined switching pattern, such that a controlled current flow is output from the AC-AC converter; and
   implement a safe-switching routine when transitioning from a first switching pattern to a second switching pattern, the safe-switching routine preventing a non-zero current from being interrupted during the transitioning from the first switching pattern to the second switching pattern.

2. The controller of claim 1 wherein, in implementing the safe-switching routine, the controller is further programmed to:
   identify, for the first switching pattern, a phase current that will next traverse a zero crossing so as to change sign;
   estimate a time point at which the identified phase current will traverse the zero crossing so as to change sign;
   establish a transition switching window about the estimated time point;
   implement the safe-switching routine at the beginning of the transition switching window; and
   maintain the safe-switching routine until the end of the transition switching window.

3. The controller of claim 2 wherein the safe switching routine comprises one of a first switching routine, a second switching routine, and a third switching routine, with the first, second, and third switching routines functioning to either:
   leave ON one of the line-side or floating-neutral side switches in the phase whose current is changing signs; or
   allow the current to go to zero in the phase whose current is changing signs, and block it at that zero level.

4. The controller of claim 3 wherein:
   if the phase current that will next traverse a zero crossing so as to change sign is flowing between the AC source and the AC load in a controlled direction at the beginning of the transition switching window, the controller is further programmed to turn the line-side switch connected to that phase to the ON condition, or to turn at least the one of the floating-side switches not connected to that phase, and connected to a phase whose current is determined to flow between the AC source and the AC load in an uncontrolled direction, in the ON condition; and,
   if the phase current that will next traverse a zero crossing so as to change sign is flowing between the AC source and the AC load in an uncontrolled direction at the beginning of the transition switching window, the controller is further programmed to turn the floating-neutral side switch connected to that phase to the ON condition, or to turn at least the one of the line-side switches not connected to that phase, and connected to a phase whose current is determined to flow between source and load in a controlled direction, to the ON condition.

5. The controller of claim 3 wherein, in implementing the safe-switching routine, the controller is further programmed to turn each of the plurality of line-side switches to the ON condition, and each of the plurality of floating-neutral side switches to the OFF condition, at the beginning of the transition switching window.

6. The controller of claim 3 wherein, in implementing the safe-switching routine, the controller is further programmed to turn each of the plurality of floating-neutral side switches to the ON condition, and each of the plurality of line-side switches to the OFF condition, at the beginning of the transition switching window.

7. The controller of claim 2 wherein, in estimating the time point at which the identified phase current will traverse the zero crossing, the controller is further programmed to:
   extrapolate to a time point at which the identified phase current will traverse the zero crossing based on a trajectory tracking of the identified phase current across multiple switching patterns to the first switching pattern; or
   extrapolate a time point at which the identified phase current will traverse the zero crossing based on a base frequency of the current, a current sign change span of 60°, and a correction factor to account for dynamic changes that affect the 60° span.

8. The controller of claim 2 wherein, in establishing the transition switching window about the estimated time point, the controller is further programmed to:
   pre-set a transition switching window width;
   set a transition switching window width based on a current noise measurement and added safety factor, divided by a slope of the current near the zero crossing; or
   employ a current threshold to set a transition switching window width concurrently with estimating the time point at which the identified phase current will traverse the zero crossing, with the transition switching window opening when a measured current with one polarity crossing the current threshold and closing when a measured current with the opposite polarity crossing the current threshold.

9. The controller of claim 1 wherein in determining the switching pattern for each of the plurality of line-side switches and each of the plurality of floating-neutral side switches, the controller is further programmed to:
   determine a switching pattern that causes a full phase voltage to be provided to the load terminals during an active mode of the circuit; and
   determine a switching pattern that causes a zero voltage to be provided to the load terminals during a free-wheeling mode of the circuit.

10. The controller of claim 9 wherein, in operating the circuit in the active mode, the controller is further programmed to:
   cause the line-side switches on supply lines having a current flowing between the AC source and the AC load in a controlled direction to operate in the ON condition;
   cause the line-side switches on supply lines having a current flowing between the AC source and the AC load in an uncontrolled direction to operate in the OFF condition;
   cause each of the plurality of floating-neutral side switches to operate in the OFF condition.

11. The controller of claim 9 wherein, in operating the circuit in the free-wheeling mode, the controller is further programmed to:
   cause the floating-neutral side switches on supply lines having a current flowing between the AC source and the AC load in a controlled direction to operate in the ON condition;
   cause the floating-neutral side switches on supply lines having a current flowing between the AC source and the AC load in an uncontrolled direction to operate in the OFF condition; and
   cause each of the plurality of line-side switches to operate in the OFF condition.

12. A load control device to control current flow to an AC load, the load control device comprising:
   a circuit including:
      an input connectable to a line terminal of an AC source;
      an output connectable to a load terminal of an AC load;
      one or more supply lines connecting the input and output to transmit power from the AC source to the AC load, each supply line corresponding to a phase in the AC load;
      a plurality of line-side switches connected between the line terminals and the load terminals, such that each supply line includes at least one line-side switch connected thereto; and
      a plurality of floating-neutral side switches connected to the load terminal at one end and together at a common connection at another end, such that each supply line includes at least one floating-neutral side switch connected thereto; and
   a controller connected to the circuit and programmed to:
      implement a switching pattern for each of the plurality of line-side switches and each of the plurality of floating-neutral side switches based on a determined direction of current flow on each of the supply lines; and
      transition between switching patterns responsive to a changing direction of current flow on a supply line, wherein in transitioning between switching patterns the controller is further programmed to:
         establish a transition window; and
         implement a transition switching pattern for each of the plurality of line-side switches and each of the plurality of floating-neutral side switches for a duration of the transition window, to prevent a voltage spike from occurring.

13. The load control device of claim 12 wherein, in transitioning between switching patterns, the controller is further programmed to:
   identify, for the present switching pattern, a phase current that will next traverse a zero crossing so as to change direction;
   estimate a time point at which the identified phase current will traverse the zero crossing so as to change direction; and
   establish the transition window about the estimated time point.

14. The load control device of claim 12 wherein, in implementing the transition switching pattern, the controller is further programmed to:
   leave ON one of the line-side switches in the phase whose current is changing direction;
   leave ON one of the floating-neutral side switches in the phase whose current is changing direction; or
   allow the current to go to zero in the phase whose current is changing direction, and block it at that zero level.

15. The load control device of claim 12 wherein the controller is programmed to operate each of the plurality of line-side switches in an ON condition at the beginning of the transition window.

16. The load control device of claim 12 wherein the controller is programmed to operate each of the plurality of floating-neutral side switches in an ON condition at the beginning of the transition window.

17. The load control device of claim 12 wherein the plurality of line-side switches and the plurality of floating-neutral side switches comprises a plurality of insulated gate bipolar transistors (IGBTs); and
  wherein the circuit further comprises diodes positioned in an anti-parallel arrangement with each of the plurality of line-side switches and floating-neutral side switches.

18. A method for controlling current flow to an AC load comprising:
  providing a circuit in series between an AC power source and the AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end;
  selectively operating the circuit in an active mode and a free-wheeling mode so as to selectively provide a full phase voltage to the load terminals during the active mode and a zero voltage to the load terminals during the free-wheeling mode of operation, wherein operating the circuit comprises:
    implementing a first switching pattern for each of the line-side switches and each of the floating-neutral side switches based on a current sign on each of the one or more supply lines, the current sign comprising a positive current or negative current; and
    implementing a second switching pattern for each of the line-side switches and each of the floating-neutral side switches upon current on one supply lines changing its current sign upon traversing a zero crossing;
  wherein, in transitioning from the first switching pattern to the second switching pattern, a transition switching pattern is implemented during a transition window established about the zero crossing of the current changing its sign.

19. The method of claim 18 wherein, in implementing the transition switching pattern, the method further comprises selecting a switching pattern that prevents a non-zero current from being interrupted during the transitioning from the first switching pattern to the second switching pattern, with the non-zero current being prevented from being interrupted by:
  leaving ON one of the line-side switches or one of the floating-neutral side switches in the phase whose current is changing direction; or
  allowing the current to go to zero in the phase whose current is changing direction, and block it at that zero level.

20. The method of claim 18 wherein, in implementing the transition switching pattern, the method further comprises:
  operating each line-side switch in the group of line-side switches in an ON condition at the beginning of the transition window; or
  operating each floating-neutral side switch in the group of floating-neutral side switches in an ON condition at the beginning of the transition window.

* * * * *